(12) United States Patent
Wadsworth

(10) Patent No.: US 8,564,538 B2
(45) Date of Patent: Oct. 22, 2013

(54) TOUCH SCREEN OVERLAYS AND METHODS FOR MANUFACTURING THE SAME

(75) Inventor: John Wadsworth, Burbank, CA (US)

(73) Assignee: Belkin International, Inc., Playa Vista, CA (US)

( * ) Notice: Subject to any disclaimer, the term of this patent is extended or adjusted under 35 U.S.C. 154(b) by 1371 days.

(21) Appl. No.: 12/255,555

(22) Filed: Oct. 21, 2008

(65) Prior Publication Data

US 2010/0097327 A1  Apr. 22, 2010

(51) Int. Cl.
*G06F 3/041* (2006.01)
(52) U.S. Cl.
USPC .......................................... 345/168; 345/173
(58) Field of Classification Search
USPC ............................................ 345/168, 173
See application file for complete search history.

(56) References Cited

U.S. PATENT DOCUMENTS

| 7,084,859 | B1 | 8/2006 | Pryor | |
|---|---|---|---|---|
| 7,697,827 | B2 * | 4/2010 | Konicek | 396/56 |
| 2002/0054030 | A1 | 5/2002 | Murphy | |
| 2005/0030296 | A1 * | 2/2005 | Stohrer et al. | 345/173 |
| 2005/0164148 | A1 * | 7/2005 | Sinclair | 434/112 |
| 2007/0013662 | A1 * | 1/2007 | Fauth | 345/168 |
| 2007/0058990 | A1 * | 3/2007 | Weaver et al. | 399/9 |

OTHER PUBLICATIONS

International Search Report for Application No. PCT/US 09/61553, dated Dec. 17, 2009.
Protrusion on "F" key of computer keyboard; 1 page; picture taken Oct. 20, 2008.
Protusion on "5" key of telephone; 1 page; picture taken Oct. 20, 2008.
Systech Displays, Inc.; Home page; http://www.systechdisplays.com/: Oct. 21, 2008; 2 pages.

* cited by examiner

*Primary Examiner* — Amare Mengistu
*Assistant Examiner* — Joseph G Rodriguez
(74) *Attorney, Agent, or Firm* — Bryan Cave LLP

(57) ABSTRACT

In one embodiment, a kit to enable non-visual use of a touch screen on an electronic device comprises an overlay comprising a surface, where the surface is substantially flat. A first portion of the surface comprises a smooth tactile characteristic, and a second portion of the surface comprises a first textured tactile characteristic, where the first portion is transparent and the second portion is translucent. The first textured tactile characteristic is proximate to an expected icon location at the surface of the overlay. The kit also comprises an instruction that comprises at least one of an indication of an installation of the overlay over the touch screen, or an identification of the electronic device. Other embodiments are described and claimed herein.

21 Claims, 3 Drawing Sheets

100

200

TOUCH SCREEN OVERLAYS AND METHODS FOR MANUFACTURING THE SAME

TECHNICAL FIELD

This disclosure relates generally to overlays, and, in particular, to touch screen overlays and methods for manufacturing the same.

BACKGROUND

Many portable electronic hand held devices provide individuals with the convenience of a touch screen that can display particular icons that, when pressed, can facilitate execution of different functions or programs of the electronic device. The individual, however, must look at the touch screen each time an icon is to be pressed to see where to touch the touch screen. In many instances it would be desirable for the individual to be able to feel where the icons are on the screen so that the individual can look at other things besides the screen. Thus, an electronic device having a tactile portion that adheres to the touch screen, wherein the tactile portion acts as a non-visual reference point or cue to the various icons or areas on the touch screen, is desirable. It would also be beneficial to be able to modify or customize touch screens to provide tactile feel and reference points.

BRIEF DESCRIPTION OF THE DRAWINGS

The invention will be better understood from a reading of the following detailed description of examples of embodiments, taken in conjunction with the accompanying figures in the drawings in which.

Figure 1:
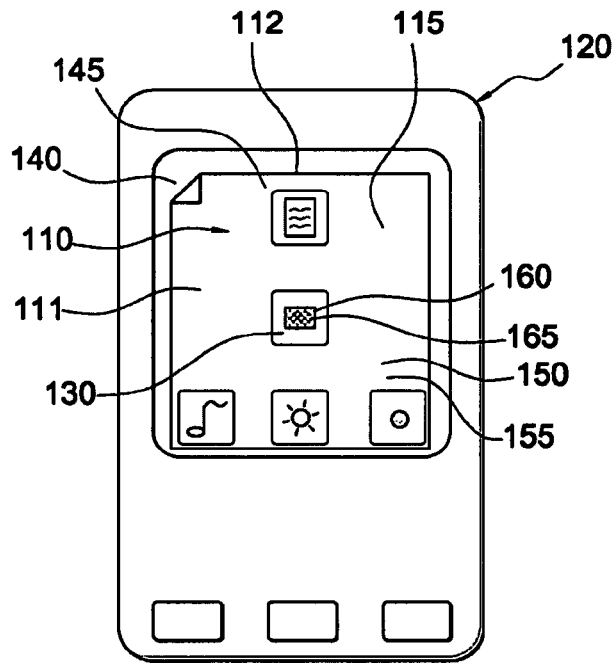
FIG. 1 is a front view of an exemplary overlay system superimposed over a touch screen of an electronic device.

For simplicity and clarity of illustration, the drawing figures show the general manner of construction. Descriptions and details of well-known features and techniques can be omitted to avoid unnecessarily obscuring a touch screen overlay and method. Additionally, elements in the drawing figures are not necessarily drawn to scale. For example, the dimensions of some of the elements in the figures can be exaggerated relative to other elements to help improve understanding of the various exemplary embodiments of the touch screen overlay. When used, the same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that ordinal terms so used are interchangeable under appropriate circumstances such that the exemplary embodiments of the touch screen overlay and method described herein are, for example, capable of operation in sequences other than those shown or otherwise described herein. Furthermore, the terms "contain," "include," and "have," and any variations thereof, are intended to cover a non-exclusive inclusion, such that a process, method, article, device, or apparatus that comprises a list of elements is not necessarily limited to those elements, but can include other elements not expressly listed or inherent to such process, method, article, device or apparatus.

The terms "left," "right," "front," "back," "top," "bottom," "side," "under," and the like in the description and in the claims, if any, are used for descriptive purposes and not necessarily for describing permanent relative positions. It is to be understood that positional terms so used are interchangeable under appropriate circumstances such that the embodiments of a touch screen overlay and method described herein are, for example, capable of operation in other orientations than those shown or otherwise described herein. The term "coupled," as used herein, is defined as directly or indirectly connected in a physical, mechanical, electrical, magnetic, chemical, or other manner.

DETAILED DESCRIPTION OF EXEMPLARY EMBODIMENTS

In one embodiment, a kit to enable non-visual use of a touch screen on an electronic device comprises an overlay comprising a surface, where the surface is substantially flat. A first portion of the surface comprises a smooth tactile characteristic, and a second portion of the surface comprises a first textured tactile characteristic, where the first portion is transparent and the second portion is translucent. The first textured tactile characteristic is proximate to an expected icon location at the surface of the overlay. The kit also comprises an instruction that comprises at least one of an indication of an installation of the overlay over the touch screen, or an identification of the electronic device. Other embodiments are described and claimed herein.

Turning now to the figures, FIG. 1 shows a front view of overlay 110 superimposed over touch screen 140 of electronic device 120, where overlay 110 forms part of kit 100. Touch screen 140 is configured to display at least one image 130, and can be configured to execute a software program or function of electronic device 120 when image 130 is touched. Image 130 is thus correlated to the software program or function. Overlay 110 can be used to interact with image 130 when overlay 110 is placed over touch screen 140.

Among certain exemplary embodiments, electronic device 120 can be portable and/or hand held, and can comprise a central processing unit ("CPU"), and memory, as well as other electronic components generally associated with portable electronic devices. In one example, electronic device 120 can be an iPhone® or an iTouch® device, but other electronic devices comprising touch screens can also benefit benefit of touch screen overlay 110. For example, persons digital assistants (PDA's), BlackBerries®, mobile phones, MP3 players, GPS navigators, portable electronic games, digital cameras, camcorders, and the like, are other exemplary electronic devices that can comprise touch screens.

Among a number of exemplary embodiments, touch screen 140 can comprise technology that facilitates, for example, activation of a function of software program by touching image or icon 130 on touch screen 140. Touch screen 140 can comprise, for example, a resistive touch screen. A resistive touch screen panel is generally composed of layers, for example, two thin metallic electrically conductive and resistive layers separated by a thin space. When an object, such as an individual's finger, touches the touch screen, the layers are connected at a certain point, and the panel then electrically acts similar to two voltage dividers with connected outputs. The particular point at where the layers connect causes a change in the electrical current, which is then registered as a touch event, and the touch event is sent to a controller, such as a CPU, for processing, e.g., to activate or execute a software program. Touch screen 140 can comprise other exemplary touch screen technological embodiments as well.

Another example of touch screen technology comprises surface acoustic wave technology. Surface acoustic wave technology comprises ultrasonic waves that pass over touch screen 140. When touch screen 140 is touched, a portion of the wave is absorbed. This change in the ultrasonic waves registers the position of the touch event and sends this information to the controller for processing.

In another exemplary embodiment, touch screen 140 can comprise a capacitive touch screen. A capacitive touch screen panel can be coated with a material, typically indium tin oxide that conducts a continuous electrical current across a sensor. The sensor exhibits a precisely controlled field of stored electrons in both a horizontal and vertical axes. When the sensor's "normal" capacitance field (its reference state) is altered by another capacitance field, e.g., an individual's finger, electronic circuits measure the resultant "distortion" in the wave characteristics of the reference field, and then send the information about the event to the controller for processing. The preceding touch screen embodiments are merely examples of touch screen technology, and other touch screen technologies can comprise, Infrared, Strain Gauge, Optical Imaging, Dispersive Signal Technology, Acoustic Pulse Recognition, Frustrated Total Internal Reflection, etc.

Among certain exemplary embodiments, image 130 can comprise an icon, and such icon can correspond to an executable software program or function. Among many exemplary embodiments, such programs or functions can comprise: telecommunication access services; communications by computer, PDA, or other handheld device; and/or transmission of data and information by electronic means, and/or broadcasting or transmission of radio and television programs/signals, and the like. Programs or functions can also comprise: telecommunications connections to computer databases and/or the Internet; electronic transmission of streamed and downloadable audio and video files via computer and other communications networks; web casting services; delivery of messages by electronic transmission; and/or telecommunications connections to electronic communications networks, transmission or reception of audio, video or multimedia content; and/or streaming of video content.

Programs or functions can further comprise: streaming and/or transmission of music, concerts, radio programs, and videos, such as music and entertainment, television programs, motion pictures, news, sports, games, cultural events, and entertainment-related programs of all kinds, via computer and/or other connected or wireless communications networks. Programs or function can likewise comprise accessing: music, concerts, videos, radio, television, news, sports, games and cultural events. Exemplary programs or functions can comprise executing handheld mobile digital electronic programs or functions for sending and receiving telephone calls, electronic mail, and for use as a handheld computer, personal digital assistant, electronic organizer, electronic notepad, and camera. The programs or functions described herein, though, are not limited in this regard.

In the present embodiment, overlay 110 comprises portion 150 and portion 160, both over surface 115 of overlay 110, where surface 115 is substantially flat. Portion 150 comprises tactile characteristic 155, while portion 160 comprises tactile characteristic 165, where tactile characteristic 155 is smooth, and tactile characteristic 165 is textured relative to tactile characteristic 155 in the present embodiment. As a result, tactile characteristic 165 is tactilely discernible from tactile characteristic 155 and/or surface 115, and can therefore serve as a point of reference to tactilely indicate a location of textured portion 160 over overlay 110. Tactile characteristics can be referred to as palpable features in some examples.

In some embodiments, tactile characteristic 165 can be located proximate to an expected icon location over surface 115 of overlay 110. Overlay 110 can thus be positioned over touch screen 140 such that tactile characteristic 165 aligns with or is proximate to image 130 of touch screen 140. In some examples, where image 130 can be a preferred icon or a regularly selected icon of touch screen 140. When tactile characteristic aligns with image 130, such alignment can facilitate locating image 130 through tactile characteristic 165 in order to actuate a software program or function. When the individual presses tactile characteristic 165, image 130 is subsequently activated and the corresponding program or function is executed without the individual having to look at touch screen 140 to determine the location of image 130.

The present embodiment shows tactile characteristic 155 and textured portion 150 as generally flat, smooth, and translucent, such that when the individual desires to view touch screen 140, for example, to locate images and/or icons, the translucency of tactile characteristic 155 and/or portion 150 allows such viewing. In some embodiments, translucent tactile characteristic 155 can also be transparent such as to permit light to pass through without significant distortion. As used herein, the term "translucent" means that light can pass through, such that "translucent" includes "transparent." In some embodiments, tactile characteristic 155 can be transparently colored. In the same or a different example, tactile characteristic 165 can also be translucent and/or transparent.

Some embodiments may also exist where at least part of tactile characteristic 165 can comprise a raised portion and/or a recessed portion relative to tactile characteristic 155 and/or surface 115 of overlay 110. In the same or a different embodiment, tactile characteristic 165 could comprise a hole formed through textured portion 160. In another embodiment tactile characteristic 165 is neither raised nor recessed, but rather comprises a different tactilely discernible texture to differentiate tactile characteristic 165 from tactile characteristic 155. For example, tactile characteristic 165 may feel rougher to the touch than tactile characteristic 155. In any event, as long as tactile characteristic 165 can be perceptively different than tactile characteristic 155, the individual can enjoy the benefits of a non-visual cue to locate a position over touch screen 140.

In some embodiments, overlay 110 can comprise a thickness of approximately between 0.05 millimeters to about 0.2 millimeters, and can thereby provide adequate transparency and/or protection for touch screen 140. In the present example, overlay 110 comprises an adhesive material coupled to its backside, opposite surface 115. The adhesive material is configured to adhere the backside of overlay 110 to touch screen 140. Also in the present example, the adhesive material permits overlay 110 to be removable from touch screen 140 once applied. In the same or a different example, the adhesive can be resilient enough to permit overlay 110 to be repositioned over touch screen 140 at least once again. In a different example, overlay 110 can be configured to adhere to touch screen 140 via an electrostatic cling.

Overlay 110 is configured in the present example to cover at least a screen portion 145 of touch screen 140, and comprises overlay length 111 and overlay width 112. Overlay length 111 corresponds to a vertical dimension of touch screen 140, while overlay width 112 corresponds to a horizontal dimension of touch screen 140. In the present example, screen portion 145 comprises most of the visible surface of touch screen 140, such that proportions of overlay 110 can substantially cover touch screen 140.

In some examples, kit 100 also comprises an instruction in addition to overlay 110. In the same or a different example, overlay 110 and/or the instruction can be included and/or at least partially encompassed by dimensions of a packaging used to distribute and/or market kit 100. The instruction can comprise a sheet and/or a pamphlet in some examples. In the same or a different example, examples, at least part of the instruction can also be printed on a surface of the packaging.

The instruction can be configured, for example, to indicate a user how to properly install overlay 110 over touch screen 140. In one embodiment, the instruction can indicate how to position overlay 110 so that tactile characteristic 165 can align with image 130. Such instruction can, in some examples, also identify a location of the touch screen where image 130 is expected to appear when device 120 is used. Some examples can provide similar indications for more than one overlay and/or tactile characteristic. In the same or a different example, the instruction can indicate how to properly adhere overlay 110 to touch screen 140, such as by illustrating how to prevent air pockets from forming between overlay 110 and screen 140, and/or by indicating how to use a specific adhesion mechanism, whether adhesive electrostatic, or otherwise, to couple overlay 110 to touch screen 140. The instruction can also indicate or identify, in some embodiments, a specific type or model of electronic device and/or software program for which it is compatible.

Figure 2:
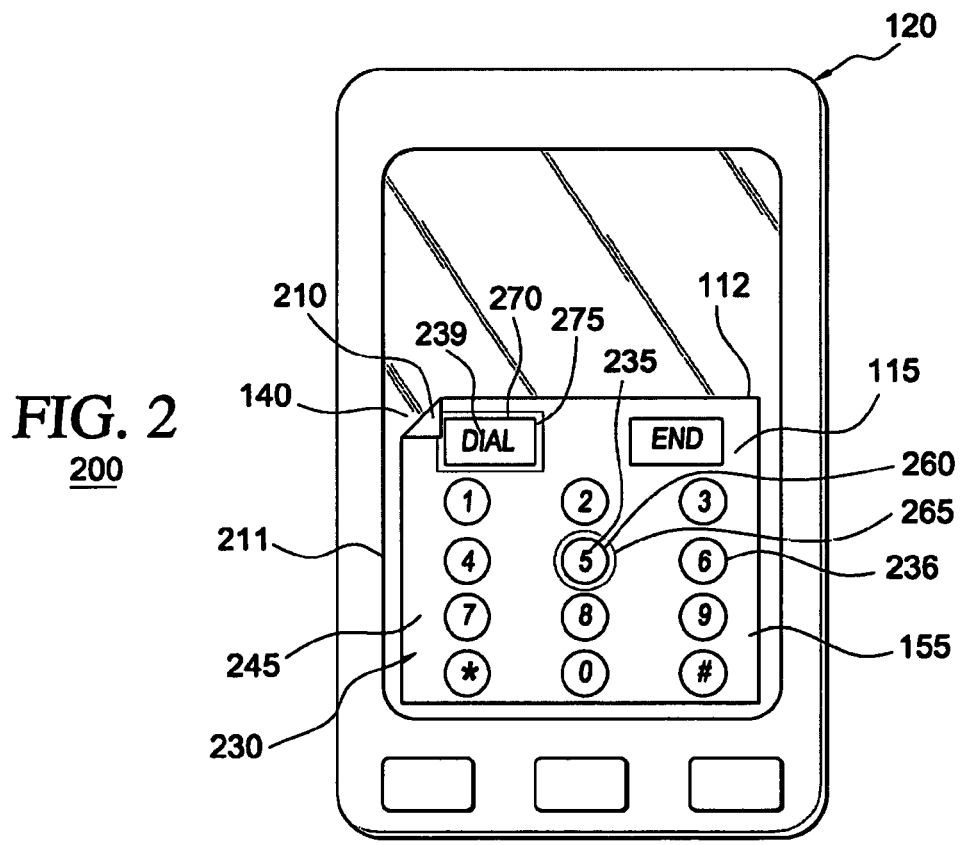
FIG. 2 shows a front view of an exemplary overlay system superimposed over the touch screen, according to another embodiment.

In a different embodiment, less than substantially all of the surface of touch screen 140 need be covered. For example, FIG. 2 illustrates a front view of an exemplary system 200, with overlay 210 superimposed over touch screen 140 of electronic device 120. Overlay 210 is similar to overlay 110 (FIG. 1), but differs by not covering substantially all of the surface of touch screen 140. Instead, overlay 210 is configured to cover only screen portion 245, comprising in this example the area where images 230 are illustrated. In the present example, images 230 correspond to dialpad icons of a software phone interface program. Overlay length 211 of overlay 210 is therefore accordingly shorter than overlay length 111 of overlay 110 (FIG. 1).

Images 230 comprise image 235, which can be similar to image 130 of FIG. 1. Similar to tactile characteristic 165 of textured portion 160, overlay 210 comprises tactile characteristic 265 of textured portion 260, where tactile characteristic 265 comprises a shape of image 235. In the present example, when overlay 210 is aligned over screen portion 245, tactile characteristic 265 serves as a tactile point of reference for image 235 by corresponding to a closed perimeter of image 235. In the same or a different example, an interior of the closed perimeter can be transparent. In some embodiments, tactile characteristic 265 can also be embossed onto overlay 210, whether during the manufacturing process or by an end user using a forming tool such as an embosser.

In addition, as shown in FIG. 2, tactile characteristic 265 need not align directly with a particular image or icon in order to correspond to it. For example, an individual may merely need tactile characteristic 265 to serve as a point of reference for an initial starting position to locate image 236. Similar to a standard qwerty keyboard that comprises slight bumps on the "F" and "J" keys to provide a typist with the initial or starting position for their fingers on the home row, tactile characteristic 265 can similarly provide an individual with an initial or starting position for tactilely locating image 236 over touch screen 140.

As shown in FIG. 2, overlay 210 also comprises portion 270 over surface 115. Portion 270 comprises tactile characteristic 275, similar to tactile characteristic 265 of portion 260. Tactile characteristic 275 differs from tactile characteristic 265 by serving as a point of reference to tactilely indicate a location of image 239 over touch screen 140, and can also comprise a texture different than that of tactile characteristic 265 in some examples. In some embodiments, overlay 210 can comprise more tactile characteristics for further ones of images 230. In some examples, tactile characteristic 275 can be pre-formed over surface 115 proximate to an expected location of image 239.

Figure 3:
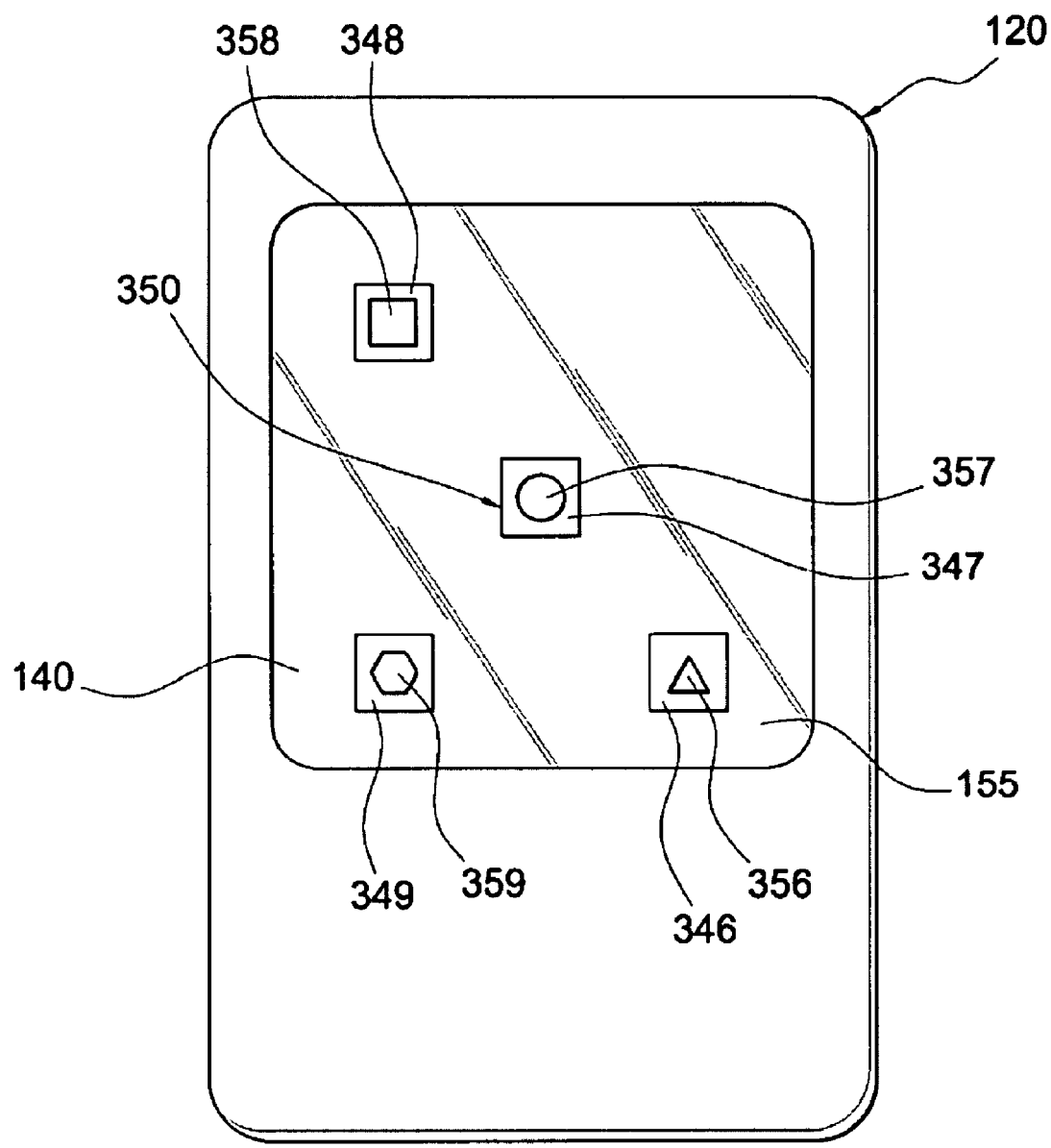
FIG. 3 illustrates a front view of an exemplary overlay system with multiple tactile characteristics.

Continuing with the figures, FIG. 3 illustrates a front view of an exemplary system 300 with multiple tactile characteristics 350. Tactile characteristics 350 are different and tactilely discernible from a surface of touch screen 140. In addition, tactile characteristics 350 can be similar to tactile characteristics 165 (FIG. 1), 265, and 275 (FIG. 2), and can correspond to different icons or different areas on touch screen 140. For example, an individual may desire to have tactile characteristics 350 correspond to two or more separate, but regularly used icons or touch screen areas. Thus, one tactile characteristic, such as tactile characteristic 356, can correspond to one icon or touch screen area, another tactile characteristic, such as tactile characteristic 357, can correspond to another icon or touch screen area, and another tactile characteristic, such as tactile characteristic 358, can correspond to yet another icon or touch screen area, and so on.

As shown in FIG. 3, system 300 comprises multiple overlays associated with different ones of the multiple tactile characteristics 350. For example, overlay 346 comprises tactile characteristic 356, while overlay 347 comprises tactile characteristic 357. In a different embodiment, system 300 could be implemented using only one overlay comprising tactile characteristics 350 spread across its surface.

The example of FIG. 3 can be well suited for situations where an individual would prefer having multiple tactile characteristics 350 correspond to icons in an hierarchical fashion. For example, one tactile characteristic, such as tactile characteristic 356, may serve as a tactile indicator of a point of reference for a particular icon, such as a "Contacts" icon. Once pressed the "Contacts" icon is pressed, a second tactile characteristic, such as tactile characteristic 357, may serve as a tactile indicator of a point of reference for an icon in a sub-menu, such as a "Friends" icon. Similarly, once the "Friends" icon is pressed, a third tactile characteristic, such as tactile characteristic 358, may serve as a tactile indicator of a point of reference correspond for yet another icon in a further sub-menu, such as an icon for a particular person on the "Friends" list. In any event, tactile characteristics 350 can assist the individual to operate touch screen 140 with tactile cues, in a non-visual manner.

As shown in FIG. 3, tactile characteristics 350 (FIG. 3) need not comprise part the same overlay, for example, in the way that tactile characteristics 265 and 275 are part of the same overlay 210 (FIG. 2). Instead, tactile characteristics 350, comprising tactile characteristic 356-359, can be individually and directly applied to certain areas of a touch screen. In a "peel" and "stick" fashion, an individual may thus apply small button-type textured portions 350. In this manner, the individual is not confined to an overlay that comprises pre-defined tactile characteristics on the overlay, and the individual can place textured "buttons" 350 over the touch screen as needed.

An exemplary kit of tactile characteristics 350 can allow an individual to tailor touch screen 140 as needed, as the individual may choose tactile characteristics 350 having different features, such as different textures, heights, thicknesses, material, size, and/or geometric shapes. For example, tactile characteristics 350 can comprise a triangular shaped tactile characteristic 356, a circular shaped tactile characteristic 357, a square shaped tactile characteristic 358, and/or a hexagonal shaped tactile characteristic 359, among others. The shapes may be regular, as shown in FIG. 3, or they can comprise a novelty or irregular shape.

In some embodiments, an overlay system can comprise more than one tactile characteristic, and the multiple tactile characteristics can comprise similar raised or recessed features and/or holes, or may comprise varied raised or recessed features and/or holes. For example, tactile characteristic 356 (FIG. 3) may comprise a thickness of approximately 0.15 millimeters, while tactile characteristic 357 (FIG. 3) may comprise a thickness of about 0.20 millimeters. In this manner an individual can further discriminate in a non-visual way between two tactile characteristics.

In still yet another exemplary embodiment, overlay 110 (FIG. 1) can comprise of different materials that can further act as non-visual cues for an individual. For example, in FIG. 3, tactile characteristic 356 comprise a material with soft, impressionable, deformable, and/or sponge-like characteristics, while tactile characteristic 357 can comprise a stiff, hard, and/or non-deformable type of material. In this manner, two different types of materials can provide tactile discernment for the individual.

In certain exemplary embodiments, an overlay may not initially comprise any tactile characteristics at all, but may comprise a malleable material that allows an individual to create their own tactile characteristics. For example, overlay 110 (FIG. 1) may come packaged with a forming tool configured to allow an individual to deform and/or texturize tactile characteristics onto overlay 110 at portions of surface 115. In some examples, the forming tool can texturize by embossing. In a different example, the forming tool can texturize by punching a tactilely perceptible hole through overlay 110. In this manner, the individual can customize overlay 110 with as few or as many tactile characteristics in portions that best suit the individual's needs or preferences.

In the same or a different embodiment, overlay 110 can comprise a memory shape material. For example, an individual may customize overlay 110, with the tool described above, and when the individual's needs change, instead of acquiring a new overlay, the present overlay can be reshaped, i.e., "flatted out," back to it's original configuration, ready for subsequent tailoring.

Figure 4:
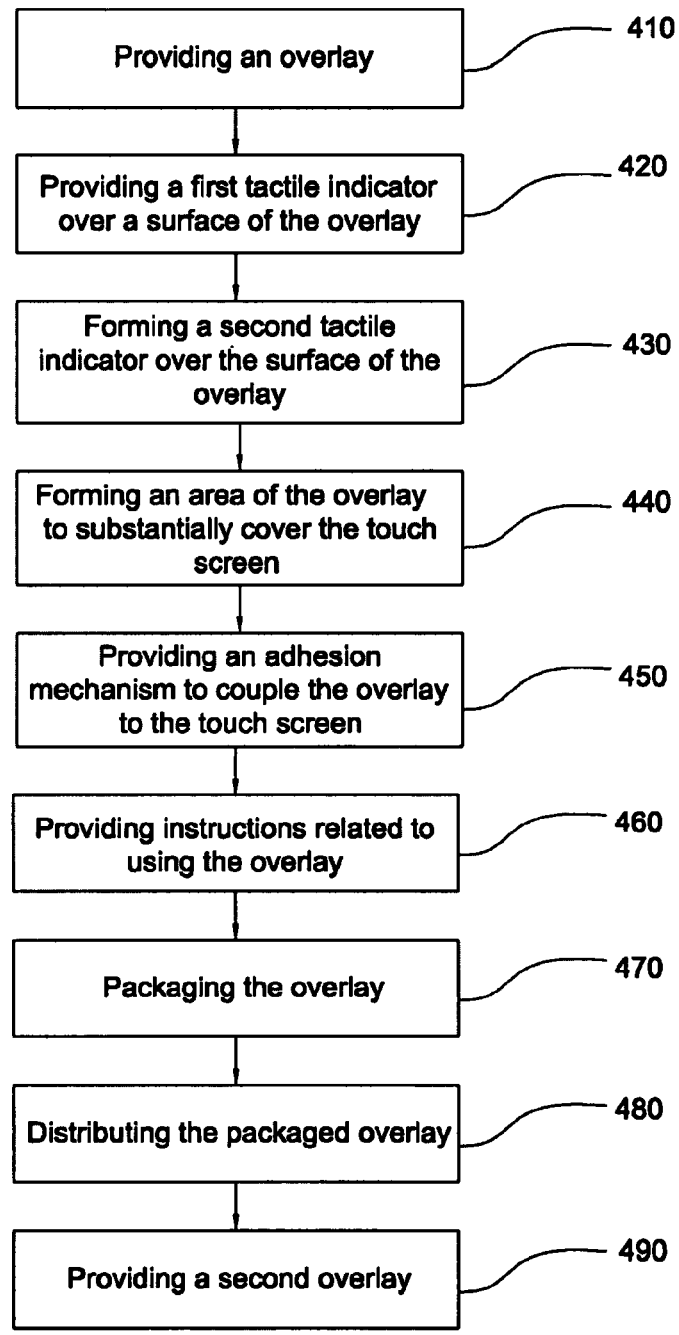
FIG. 4 shows a block diagram of a method of manufacturing an overlays for touch screens, similar to the overlays of FIGS. 1-3.

Continuing with the figures. FIG. 4 illustrates a block diagram of a method 400 of manufacturing an apparatus for locating an icon on a touch screen of an electronic device. In one example, the icon can be similar to image 130 of touch screen 140 (FIG. 1), among others previously described, and can be correlated to a software program of the electronic device.

Block 410 of method 400 comprises providing an overlay. In some examples, the overlay can be similar to one of overlays 110 (FIG. 1), 210 (FIG. 2), and/or 346-349 (FIG. 3). Block 420 of method 400 comprises forming a first tactile indicator over a surface of the overlay. In some embodiments, the first tactile indicator can be similar to one or more of tactile characteristics 155, 165 (FIG. 1), 265, 275 (FIG. 2), and/or 356-359 (FIG. 3). The first tactile indicator is tactilely discernible from the surface of the overlay, and can correspond to an expected location of the icon relative to the surface of the overlay.

In some examples, at least a portion of the first tactile indicator can be either raised or depressed relative to the surface of the overlay such as to provide tactile feedback. In the same or a different example, an outline shape of the first tactile indicator can correspond to a perimeter of the icon when the overlay is positioned over the touch screen. Forming the first tactile indicator can also comprise embossing the first tactile indicator onto the surface of the overlay, in some embodiments.

Block 430 of method 400 comprises forming a second tactile indicator over the surface of the overlay. The second tactile indicator can be similar to the first tactile indicator introduced in Block 420, but can be located elsewhere to correspond with an expected location of a second icon relative to the surface of the overlay.

Block 440 of method 400 comprises forming an area of the overlay to substantially cover the touch screen. In some embodiments, the area of the overlay can be defined by an overlay length and an overlay width, similar to overlay length 111 and overlay width 112 of overlay 110 (FIG. 1). In other examples, the overaly of method 400 need only partially cover the touch screen.

Block 450 of method 400 comprises providing an adhesion mechanism to couple the overlay to the touch screen. In some examples, the adhesion mechanism can comprise an adhesive material, similar to as described for overlay 110. In a different example, the adhesion mechanism can comprise electrostatic cling for adhering the backside of the overlay to the touch-screen. The adhesion mechanism can be configured to permit the overlay to be removable from, and/or repositionable over, the touch screen.

Block 460 of method 400 comprises providing instructions related to using the overlay. The instructions can be tailored, for example, to assist individual or end users in configuring, positioning, and/or using the overlay of Block 410. The instructions may also provide an indication of how to tactilely reference the first tactile indicator of Block 420 to locate the icon. In some examples, the instructions can be presented on an instruction sheet or pamphlet. In the same or a different example, the instructions may comprise information to identify a specific type of device and/or a software program of the specific device for which the overlay is tailored.

Block 470 of method 400 comprises packaging the overlay prior to distribution. In one example, Block 470 can also comprise packaging the instructions of Block 460 along with the overlay, and/or printing the instructions on the packaging. The packaging can also identify any specific device and/or software program for which the overlay is tailored, in some examples.

Block 480 of method 400 comprises distributing the overlay in order to make the overlay available to purchasers or users, for example, by the manufacturer of the overlay, distributors, marketers, or resellers. The overlay can be distributed or made available through marketing, the internet, or using wholesale distribution methods or retail networks that cater to midstream parties and end users.

Block 490 of method 400 comprises providing a second overlay, where the second overlay can be similar to one or more of the overlays described for Block 410. In some examples, providing the second overlay can comprise forming a second tactile indicator on the second overlay to correspond with an expected location of a second icon relative to the surface of the second overlay.

Although a particular order is illustrated in FIG. 4 for method 400, the blocks of method 400 can be performed in other temporal sequences. In some examples, some of the blocks of method 400 can be optional or skipped. For example, block 430 of method 400 can be optional, as the method of manufacture can forego the forming of a second tactile indicator. In the same of a different example, block 440 can be carried out before block 420. Other similar permutations in the sequence or content of method 400 are envisioned.

Although the invention has been described with reference to specific embodiments, it will be understood by those skilled in the art that various changes may be made without departing from the spirit or scope of the invention. For example, in one embodiment, a touch screen overlay can have one or more elements of FIG. 1 with or without elements described with reference to FIG. 2 or 3. Similarly, in different embodiments, a touch screen overlay can have one or more of the elements of FIG. 3 with or without the elements of FIG. 1 or 2. A touch screen overlay can also have one or more of the elements of FIG. 2 with or without the elements of FIG. 1 or 3.

Accordingly, the disclosure of embodiments of the touch screen overlays and methods for manufacturing the same is intended to be illustrative and not limiting. It is intended that the scope of the touch screen overlays and methods for manufacturing the same disclosed herein shall be limited only to the extent required by the appended claims. The touch screen overlays and methods for manufacturing the same discussed herein can be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment of a touch screen overlays and methods for manufacturing the same, and can disclose alternative embodiments of the same or other touch screen overlays and methods for manufacturing the same.

All elements claimed in any particular claim are essential to the invention claimed in that particular claim. Consequently, replacement of one or more claimed elements constitutes reconstruction and not repair. Benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A kit to enable non-visual use of a touch screen on an electronic device, the kit comprising:
   an overlay comprising a surface;
   a first portion of the surface comprising a smooth tactile characteristic;
   a second portion of the surface comprising a first textured tactile characteristic; and
   a forming tool with protrusions to texturize the first textured tactile characteristic onto the second portion;
   wherein:
   the surface is substantially flat;
   the first portion is transparent;
   the second portion is translucent;
   the first textured tactile characteristic is proximate to an expected icon location at the surface of the overlay;
   an adhesion mechanism at a backside of the overlay is configured to couple the overlay to the touch screen; and
   the overlay is repositionable over the touch screen via the adhesion mechanism.

2. The kit of claim 1, further comprising:
   an instruction; and
   a packaging comprising dimensions that at least partially encompass the overlay;
   wherein:
   the instruction comprises at least one of:
   an indication of an installation of the overlay over the touch screen; or an identification of the electronic device; and
   the instruction is at least one of:
   printed on a surface of the packaging; or
   included within the packaging.

3. The kit of claim 1, wherein:
   the overlay comprises proportions that substantially cover the touch screen.

4. The kit of claim 1, wherein:
   at least part of the first textured tactile characteristic comprises a raised portion relative to the first portion of the overlay.

5. The kit of claim 1, wherein:
   at least part of the first textured tactile characteristic comprises:
   a recessed portion configured to be located at the expected icon location at the surface of the overlay, the recessed portion being permanently recessed.

6. The kit of claim 1, wherein:
   the first textured tactile characteristic comprises an icon outline shape.

7. The kit of claim 1, wherein:
   the overlay comprises a thickness of between 0.05 millimeters and 0.2 millimeters.

8. The kit of claim 1, wherein:
   the overlay comprises a memory shape material.

9. The kit of claim 1, further comprising:
   a third portion of the surface comprising a second textured tactile characteristic;
   wherein the third portion is translucent and the second textured tactile characteristic is proximate to a second expected icon location at the surface of the overlay.

10. The kit of claim 9, wherein:
    the first and second textured tactile characteristics are hierarchically located at the surface of the overlay relative to the first and second expected icon locations.

11. The kit of claim 1, further comprising:
    the electronic device;
    wherein:
    the touch screen of the electronic device comprises a first icon; and
    the first textured tactile characteristic is proximate to the first icon when the overlay substantially covers the touchscreen.

12. The kit of claim 11 further comprising:
    a third portion of the surface comprising a second textured tactile characteristic;
    wherein:
    the touch screen of the electronic device further comprises a second icon; and
    the second textured tactile characteristic is proximate the second icon when the overlay substantially covers the touchscreen.

13. The kit of claim 1, wherein:
    the first textured tactile characteristic is embossed onto the surface of the overlay.

14. A kit to enable non-visual use of a touch screen on an electronic device, the kit comprising:

an overlay comprising a surface;
a first portion of the surface comprising a smooth tactile characteristic;
a second portion of the surface comprising a first textured tactile characteristic;
an instruction; and
a forming tool with protrusions to texturize the first textured tactile characteristic onto the second portion;
wherein:
the surface is substantially flat;
the first portion is transparent;
the second portion is translucent;
the first textured tactile characteristic is proximate to an expected icon location at the surface of the overlay; and
the instruction comprises at least one of: an indication of an installation of the overlay over the touch screen; or an identification of the electronic device.

15. A kit to facilitate tactile use of a touch screen of an electronic device, the kit comprising:
a first overlay comprising a first palpable feature and a first adhesion mechanism on a backside of the first overlay;
a second overlay comprising a second palpable feature and a second adhesion mechanism on a backside of the second overlay; and
an instruction;
wherein:
the first and second overlays are translucent;
the first palpable feature is tactilely discernible from the touch screen at a first icon expected location over the touch screen;
the second palpable feature is tactilely discernible from the touch screen at a second icon expected location over the touch screen; and
the instruction comprises at least one of:
an indication of an installation of at least the first overlay over the first icon expected location over the touch screen; or an identification of the electronic device.

16. The kit of claim 15, wherein:
the touch screen comprises one or more icons correlated to one or more functions of a software program of the electronic device;
the instruction further comprises:
an indication to align the first palpable feature proximate to a first one of the one or more icons when the first overlay is positioned over a first portion of the touch screen; and
an indication to align the second palpable feature proximate to a second one of the one or more icons when the second overlay is positioned over a second portion of the touch screen.

17. A method for manufacturing an apparatus for locating an icon on a touch screen of an electronic device, the icon correlated to a software program, the method comprising:
providing an overlay;
forming a first tactile indicator on the overlay to correspond to an expected location of the icon under the overlay;
providing a second overlay; and
forming a second tactile indicator on the second overlay to correspond with an expected location of a second icon under the second overlay;
wherein:
the overlay is substantially flat and translucent; and
the first tactile indicator is tactilely discernible from a surface of the overlay and comprises at least one of:
a texturized portion;
a raised portion relative to the surface of the overlay;
a recessed portion relative to the surface of the overlay; or a hole.

18. The method of claim 17, further comprising:
forming another tactile indicator on the overlay to correspond to an expected location of a another icon under the overlay.

19. The method of claim 17, further comprising:
providing an instruction configured to indicate at least one of:
a manner of positioning the overlay over the touch screen;
an identification of the electronic device; or
an identification of the software program; and
further comprising at least one of:
packaging the overlay;
marketing the overlay; or
distributing the packaged overlay.

20. The method of claim 17, wherein:
forming the first tactile indicator comprises:
forming the first tactile indicator to correspond to a perimeter of the icon when the overlay is positioned over a portion of the touch screen.

21. The method of claim 17, wherein forming the first tactile indicator comprises:
forming the first tactile indicator comprises:
embossing the first tactile indicator onto the surface of the overlay.

* * * * *